Oct. 3, 1967 W. S. PRATT 3,345,444
METHOD AND APPARATUS FOR FORMING AN INTERMITTENT PATTERN
Filed Dec. 16, 1963 2 Sheets-Sheet 1

INVENTOR.
WILLIAM S. PRATT
BY
*Burns, Doane, Benedict, Swecker, & Mathis*
ATTORNEYS.

Oct. 3, 1967     W. S. PRATT     3,345,444
METHOD AND APPARATUS FOR FORMING AN INTERMITTENT PATTERN
Filed Dec. 16, 1963                                      2 Sheets-Sheet 2

INVENTOR.
WILLIAM S. PRATT
BY
*Burns, Doane, Benedict, Swecker, & Mathis*
ATTORNEYS

United States Patent Office

3,345,444
Patented Oct. 3, 1967

3,345,444
METHOD AND APPARATUS FOR FORMING AN INTERMITTENT PATTERN
William S. Pratt, Granville, Mass., assignor to Monsanto Company, a corporation of Delaware
Filed Dec. 16, 1963, Ser. No. 330,997
10 Claims. (Cl. 264—167)

ABSTRACT OF THE DISCLOSURE

A method and apparatus for forming an accurate, intermittent stripe in the wall of a thermoplastic parison, by interrupting the feed of stripe material into the flow of the main parison material with a valve movably mounted in the extrusion head, while at the same time injecting a stream of the main parison forming material through the valve along the path which the stripe material formerly occupied.

*Specification*

This invention relates generally to a method and apparatus for forming an intermittent pattern in plastic material. More particularly, this invention involves a method and apparatus for extruding a tubular plastic member having a longitudinally extending series of spaced or intermittent stripe sections.

Longitudinal stripes have been incorporated in hollow plastic articles for both functional and esthetic reasons. Stripes of transparent or opaque material have provided means for accurately measuring and dispensing the products contained in such hollow articles. Such windows have enabled users to readily ascertain the level of material contained within articles. Moreover, stripes of different colors in plastic articles have been used to create artistic effects.

In the manufacture of hollow plastic articles, plastic material such as polyethylene may be extruded in the form of a hollow tube commonly called a parison. The parison may then be molded to the desired shape by techniques well known in the industry. A stripe may be formed during the extrusion of the parison by injecting the stripe material into the flow path of the main parison material as it passes through the extruder head. In the past, stripe material has been superimposed upon the main parison material or has been flowed continuously in a separate striping zone. Neither of these techniques have lended themselves to the formation of intermittently formed zones of parison material which were different from the material employed in forming the parison body and which extended entirely through the parison wall.

It thus is an object of the present invention to provide a method and apparatus for extruding a plastic length having longitudinally spaced zones of material which differs from the main body of material used to form the length.

It is a more specific object of this invention to provide a method and apparatus for producing an intermittent or interrupted stripe in a parison which extends entirely through the parison wall.

A still further object of this invention is to provide such a method and apparatus which enables the formation of accurate, intermittent patterns and particularly promotes the uniting of the pattern and main parison materials.

These and other objects may be realized, according to this invention, by a technique which includes feeding the main material of the parison through a zone and selectively injecting the stripe material into that zone. The feed of the stripe material may be interrupted, and at the same time, the main material then injected into the zone along the path formerly occupied by the stripe material.

In the preferred embodiment of the invention, a conventional extrusion head including a casing, mandrel, and an extrusion orifice is equipped with a novel striping means. A channel is provided from the source of the base material to one of the cartridge heater holes from which the resistance heater has been removed and which has been appropriately plugged to form a secondary passageway for the base material. By means to be shortly described, base material flows from the passageway through a lateral port.

A chamber is formed in the outer wall of a distributor ring which forms a restricted passageway between it and a similar ring portion on the mandrel for the flow of the material. The material from which the stripe is to be formed is introduced under pressure into this chamber. A feed hole interconnects this chamber with the restricted passageway for the injection of the stripe feed material into the flow of the base material.

An elongated needle-like member is provided which can block-off the feed hole to interrupt the supply of the stripe material. This needle is provided with a longitudinal bore and a radially extending opening which provides communication between the feed hole and the aforesaid lateral port simultaneously with the interruption of the flow of the stripe material.

A more complete understanding of these and other features of the invention will be gained from a consideration of the following description of the invention illustrated in the accompanying drawings in which.

Figure 1:
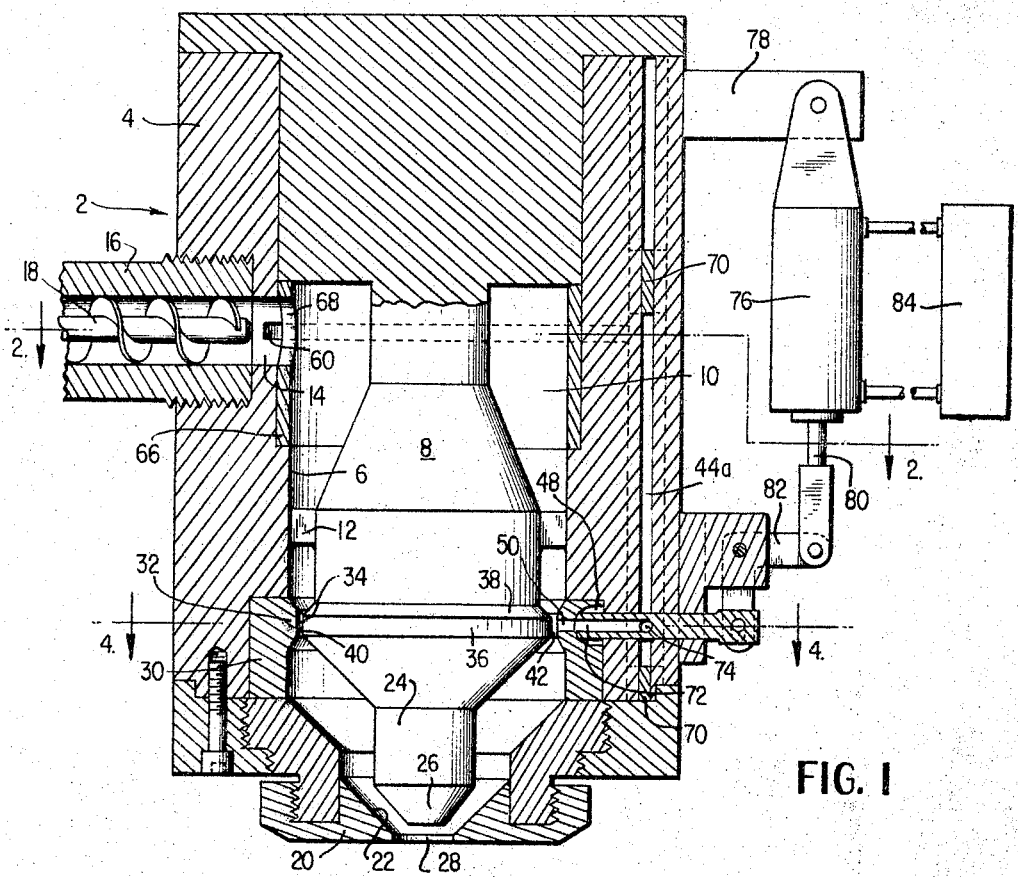
FIGURE 1 is a vertical cross-sectional view of an extrusion head incorporating the novel striping means, as viewed along the section line 1—1 of FIGURES 2 and 3.
Figure 2:
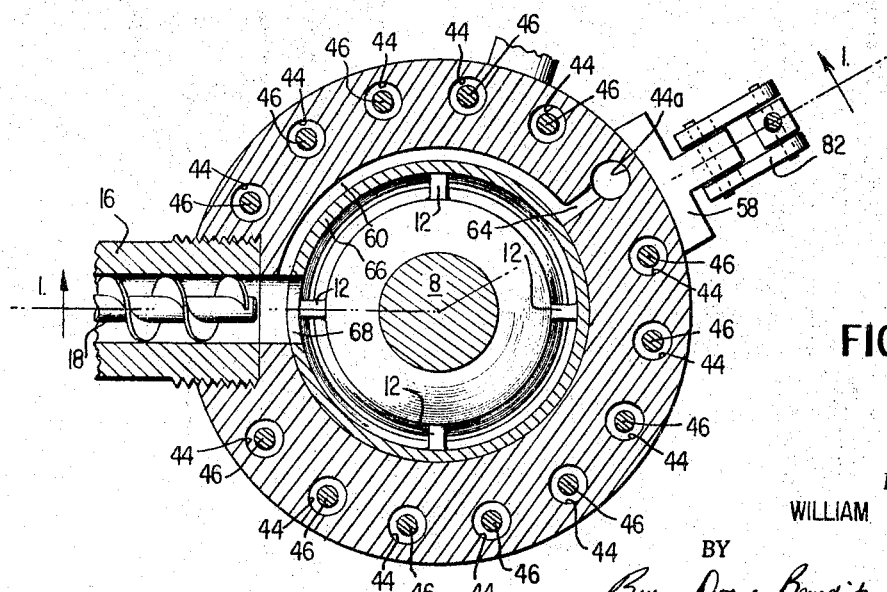
FIGURE 2 is a horizontal cross-sectional view taken along the section line 2—2 of FIGURE 1.

Referring more specifically to the drawings, FIGURE 1 shows a conventional extrusion head 2 which includes a substantially cylindrical outer casing member 4 having a bore 6 therein. Mounted within the bore 6 is an elongated mandrel 8 which is spaced from the walls of the bore 6 to provide a passageway 10 extending axially of the casing member. The mandrel 8 may be held in its position spaced from the walls of the casing member 4 by a plurality of circumferentially spaced webs 12. It should be understood that the mandrel is shown schematically in the drawings.

An opening 14 is provided in the wall of the casing member 4 near the top of the passageway 10. An extruder 16, utilizing a screw conveyor 18, may be attached to the wall of the casing in alignment with the opening to supply the main parison material under pressure to passageway 10. However, it should be understood that any type conveyor can be used with the present invention which will subject the material to the proper pressure necessary for the flow through passageway 10.

An annular ring member 20 is attached to the casing adjacent its bottom end. Member 20 may have a downwardly and inwardly tapering inner surface 22. The mandrel 8 may be provided with a tip portion 24 which has a downwardly and inwardly extending surface 26. If desired tip 26 may comprise a movable mandrel portion capable of limited axial adjustment in a conventional fashion. The two surfaces 22 and 26 are spaced apart a predetermined amount to provide an annular extrusion orifice 28 for the passage of the extruded material.

Within the bore of the outer casing member, between the incoming opening 14 and the orifice 28, an outer distributor ring 30 is provided. This ring has an inwardly extending tapering portion 32 which terminates in an edge surface 34. Positioned opposite the outer distributor ring 30 is an inner distributor ring 36. This ring may be formed integrally with the mandrel or may be a separate member mounted thereon. The inner ring 36 has an outwardly extending tapering portion 38 which terminates in an edge surface 40. The two edge surfaces are in radial alignment and spaced a predetermined distance from each other to form an annular distributor slot 42.

The outer casing 4 of the extruder head may be provided with a series of longitudinal holes 44. A cartridge resistance heater 46 may be positioned in at least some of these holes in a manner well known in the art to keep the distributor head at the proper temperature.

The base material from which the main portion of the parison is to be formed, which material may comprise opaque or colored polyethylene, passes into the passageway 10 through opening 14 under the influence of the extruder 16. The material flows about the mandrel downwardly and through the distributor slot 42 which distributes the flow of material evenly to the orifice 28. As the material passes through the orifice 28 it is formed into an elongated tubular member. The tubular article may undergo further processing to provide enclosed containers or the like in the manner well known in the art.

The material which is to form the stripe in the tubular member, which material may comprise transparent or translucent polyethylene, is fed into a chamber 48 formed in the outer wall of the distributor ring 30 through an opening 49 in the wall of the outer casing member 4. An extruder 52 having a screw conveyor 54 is shown attached to the casing 4 in alignment with the opening 49. It is to be understood that any extruder may be used for feeding the stripe material. A feed hole 50 is provided in the outer distributor ring 30 to connect the chamber 48 with the distributor slot 42. The feed hole 50 extends radially of the distributor ring and is perpendicular to the flow of the base material passing through the distributor slot 42.

The stripe material is fed from the extruder 52 under pressure into the chamber 48 and passes into the distributor slot through the communicating feed hole 50. This stripe material should be at a slightly higher pressure than the base material so that it can flow freely into the distributor slot and provide a separation in the flow of the base material at the point the stripe material is injected into the distributor slot. The stripe material then flows longitudinally of the extrusion head with the base material through the orifice 28. At the same time it merges with the main base material and becomes an integral part of the extruded tubular member.

In some instances where the pressure of the stripe material is relatively small, it may be necessary to provide positive means to separate the flow of the base material so that the stripe material may enter the distributor slot. This may be accomplished by providing a conventional flow divider positioned immediately above the distributor slot at the entrance of the feed hole 50.

Figure 3:
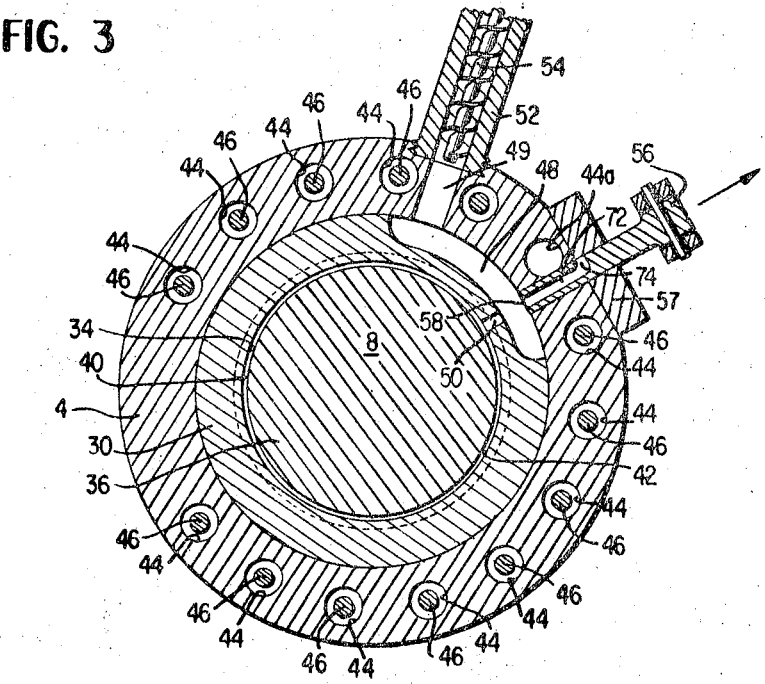
FIGURE 3 is a horizontal cross-sectional view taken along the section line 3—3 of FIGURE 1 showing the needle-like member in a first or stripe forming position.
Figure 4:
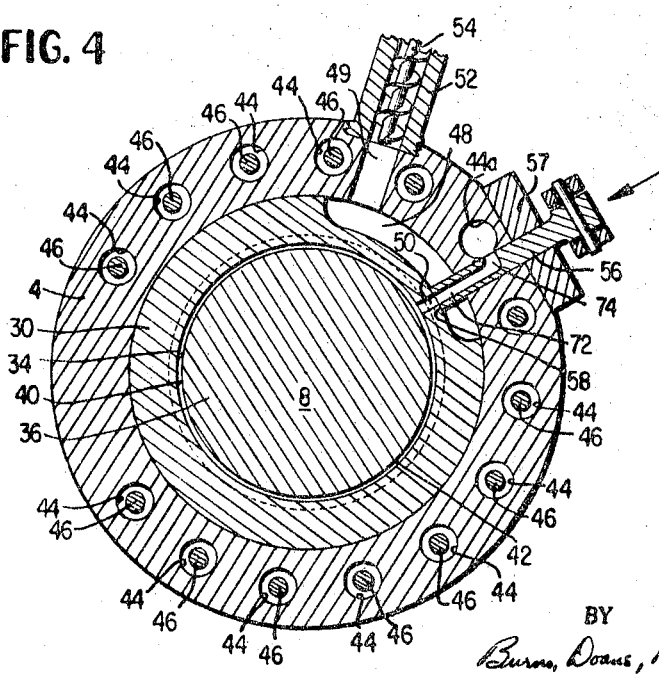
FIGURE 4 is a partial cross-sectional view similar to that of FIGURE 3 showing the needle-like member in a different or non-striping position.

A needle-like valve member 56 is mounted for radial reciprocal movement in the wall of the outer casing member. It may be supported by a bushing or bearing member 57. As shown in FIGURES 3 and 4, the axis of the needle is substantially in alignment with the axis of the feed hole 50. The diameter of the needle may be greater than the diameter of the feed hole. The needle 56 terminates in an end surface 58 which corresponds in shape to the walls of the chamber immediately surrounding the feed hole 50. Thus when the needle is moved inwardly from its position in FIGURE 3 to its position in FIGURE 4 the surface 58 abuts the wall of the chamber surrounding the feed hole 50 and provides a seal to prevent the flow of the stripe material from chamber 48 into the feed hole 50.

The extruder head is constructed so that at the time the flow of the stripe material is interrupted by the movement of the needle inwardly against the wall of the chamber 48, the base material will be fed into the distributing slot 42 through passage means comprising the feed hole 50. A channel 60 is provided in the wall of the bore of the outer casing member which extends from the opening 14 in the casing, circumferentially of the casing member, to a point radially inwardly of one of the cartridge heater holes 44a from which the resistance heater has been removed. A bore 64 connects this heater hole 44a and the channel 60. The cartridge heater hole 44a should be plugged immediately above the hole 64 and immediately below the plane of the needle-like valve member 56 as shown at 70 to limit the flow of the base material.

To provide an enclosed flow path for the base material flowing to the hole 44a, a sleeve like member 66 may be provided which fits in a counter sunk bore in the internal surface of the casing member and covers the channel 60. Member 66 is provided with a hole 68 to permit the passage of the base material from the extruder 16 directly into passageway 10.

Referring to FIGURES 3 and 4 it can be seen that the bore in which the needle-like member 56 is positioned intersects a side portion of the cartridge heater hole 44a. To complete the passageway for the secondary source of base material, the needle 56 is provided with axially extending bore 72 which may be of substantially the same diameter as feed hole 50. A radially extending hole 74 is provided at a point intermediate, i.e., generally midway, of the ends of the needle and communicates with the bore 72. As can be seen in FIGURE 4, when the surface 58 of the needle is abutting the wall around the feed hole 50 of the chamber, the hole 74 communicates with the cartridge heater hole 44a. As can be seen, a passageway is thus provided for the base material extending from a point adjacent the extruder 16 to the feed hole 50 when the needle-like member is in its inward position.

The needle 56 may be reciprocated by the action of a double acting air cylinder and piston mechanism 76. As shown, mechanism 76 may be attached by a suitable member 78 to the extrusion head. The piston rod 80 that is movable with the piston is connected through a suitable crank arm linkage 82 to the needle to provide reciprocal movement of the needle as the piston moves up and down. A timing mechanism 84 should be provided in conjunction with the air cylinder to provide automatic operation of the air cylinder at timed intervals. Any suitable type of control such as a timing drum may be utilized. It will be apparent that the length of time between the formation of one stripe segment and the next in the extruded hollow article is dependent on such factors as the rate of extrusion, length of the parison, and the desired length of the stripe. However, it is well within the skill of the art for one to determine exactly how long the stripe material should be fed into the distribution slot to produce a stripe of a given length in the final article.

In operation, when it is desired to produce a stripe in the extruded tubular member, the base material enters passageway 10 through opening 14 in the casing wall and passes axially down the extruder head through the restricted distributor slot 42. The needle-like member 50 is in its retracted position shown in FIGURE 3 and the stripe material enters chamber 48 and passes into the distributor slot 50 in a direction perpendicular to the flow of the main material and divides the flow of the base material at that point. The two materials then merge as they pass through the orifice 28.

When it is desired to discontinue the stripe, the control mechanism 84 operates the piston in cylinder 76 to move the needle inwardly to its position shown in FIGURE 4 so that its end surface abuts the wall surrounding the feed hole 50. At this time the supply of the striping material into the distributor slot is interrupted. Simultaneously with the interruption of the supply of the stripe material to the feed hole 50, the hole 74 in the needle aligns with the opening in the wall of the cartridge heater hole 44a and the bore 72 aligns with the feed hole 50 to provide a path for the flow of the base material into the distributor slot in place of the stripe material.

When it is desired to resume the striping operation, the piston rod 82 will move in the opposite direction and the needle will move in the outwardly direction. At this point, the flow of the base material through the feed hole 50 is discontinued due to the break in communication between the hole 74 in the needle-like member and the cartridge heater hole 44a. At the same time, the end surface of the needle moves away from the wall of the chamber 48, and the stripe material in chamber 48 can pass through the feed hole into the distributor slot.

This action results in a continuous supply of material through the feed hole 50 into the path of the main material at all times whether a stripe is being produced or not. Such action prevents any irregularities in the wall of the extruder tubular member which may arise because of the relatively high viscosity of the materials normally used in forming the parison. During the striping operation, if the stripe material flowing through the feed hole 50 was interrupted without simultaneously supplying the base material through the same opening, the divided flow path of the main material, which has been established by the forcing of the stripe material into the distributor slot, might not close immediately due to the high viscosity of the base material. During subsequent operations on the tubular member this could result in an imperfection of the wall surface at the point at the top of the stripe in the body of the article.

If the pressures of the stripe or the base material are high, or one of the materials is interrupted for a relatively long period, it may be necessary to provide an accumulator in connection with the extruders. Such accumulators are well known in the art as shown by the Ferngren 2,230,188 patent. They may comprise chambers, each having a spring pressed plunger which is adapted to accommodate excess material.

It will readily be appreciated that an additional feature of this invention resides in the ease with which a conventional extrusion head may be modified to produce an intermittent pattern in an extruded parison. By making fairly few structural changes in a conventional extrusion head, and by utilizing an existing heater hole as a plastic material passageway, an intermittent pattern forming apparatus may be readily provided.

A particular advantage of the invention involves the manner in which an intermittent series of longitudinally spaced segments may be formed in a length of extruded material so as to extend entirely through the wall thickness of the length but blend uniformly, evenly, and completely with the main body of material. To a large extent, these advantages result from the alternating flow of parison body and pattern material into the same zone within the principal flow path of the body materials.

It will be understood, of course, that while the invention has been described with reference to a preferred embodiment, it is not limited to the precise form of the disclosed apparatus, to the specific parison form described, or to the particular plastic materials described.

In employing the invention it will be apparent that the intermittent pattern may be formed with plastic material which may be transparent, translucent, or opaque and that the main body of plastic material may also be transparent, translucent, or opaque. It will be equally apparent that the plastic material of the intermittent pattern and the main body of the extruded length may be diverse in color composition, or other properties so long as proper bonding of these materials is possible. It is also obvious that the invention is not limited to the forming of a single, narrow pattern zone as illustrated, or to the forming of multiple pattern segments in each length of plastic material used in forming an individual article.

Those skilled in the art will readily envision additions, deletions, substitutions, and modifications which would be consistent with or equivalent to the invention herein described.

In ascertaining what is deemed to be the scope of the invention, reference may be had to the appended claims.

What is claimed is:

1. An apparatus for extruding a thermoplastic parison having an intermittent stripe extending through the parison wall, comprising means for supplying a first thermoplastic material from which the main portion of the parison is formed to a zone within an extrusion head, means for supplying a second thermoplastic material from which the stripe is formed to a striping portion of said zone, and a valve member movably mounted in the extrusion head for intermittently interrupting the flow of said second plastic material to said striping portion of said zone while simultaneously allowing the flow of said first material through said valve member to said striping portion of said zone when said valve member is in one position, and for intermittently interrupting the flow of said first plastic material to said striping portion of said zone while simultaneously allowing the flow of said second material to said striping portion of said zone when said valve member is in another position.

2. An apparatus as described in claim 1 wherein said striping portion on said zone comprises a segmental portion of a restricted annular passageway in said extrusion head, said annular passageway being adapted to define a generally annular flow path for plastic material with there being a continuous flow of said first thermoplastic material through said annular passageway adjacent each side of said segmental portion.

3. An apparatus for extruding a thermoplastic parison having an intermittent stripe extending through the parison wall, comprising a casing having a bore therethrough, mandrel means positioned within the bore and spaced from said casing to provide a first passageway, a ring positioned about the opening of said bore and spaced from said mandrel means a predetermined distance to form an extrusion orifice, means for supplying a first thermoplastic material, from which the main portion of the parison is formed, under pressure to said first passageway, a second passageway in said casing, means for supplying a second thermoplastic from which the stripe is formed under pressure to said second passageway, a third passageway in communication with said first mentioned thermoplastic material supplying means, and a valve member movably mounted in the casing for alternately connecting said second and third passageways with said first passageway.

4. An apparatus for extruding a thermoplastic parison having an intermittent stripe extending through the parison wall, comprising a casing having a bore therein, mandrel means positioned within said bore and spaced from said casing to provide a first passageway, a ring positioned adjacent the end of said bore and spaced from the end of said mandrel means a predetermined distance to form an extrusion orifice, an inwardly tapering portion on the inner wall of said casing, an outwardly tapering portion on said mandrel means spaced from said first tapering portion a predetermined amount to form a restricted passageway having a stripe forming portion therein, means for supplying a first thermoplastic material from which the main portion of the parison is formed, under pressure to said first passageway, a second passageway in said casing, means for supplying a second thermoplastic from which the stripe is formed under pressure to said passageway, a third passageway communicating with said first thermoplastic material supplying means, and a valve member reciprocally mounted in the casing for alternately connecting said second and third passageway with said first passageway at said stripe forming portion of said restricted passageway.

5. An apparatus for extruding a thermoplastic parison having an intermittent stripe extending through the parison wall, comprising a casing having a bore therein, mandrel means positioned within said bore and spaced from said casing to provide a first passageway, a ring positioned adjacent the end of said bore and spaced from the end of said mandrel means a predetermined amount to form an extrusion orifice, means for introducing a first thermoplastic material from which the main portion of the parison is formed under pressure into said first passageway, an outer distributor ring on the internal surface of said bore having an inwardly tapering portion, an inner distributor ring on said mandrel means having an outwardly tapering portion spaced from said first mentioned tapering portion a predetermined amount to form a distributor slot in said passageway, a second passageway in said casing separated from said first passageway, means for introducing a second thermoplastic material from which the stripe is formed under pressure into said second passageway, a feed hole extending from said second passageway to said distributor slot, a third passageway in said casing separated from said first and second passageways and communicating with the means for introducing said first thermoplastic material under pressure, and a valve member movably mounted in the casing for interrupting the communication between said feed hole and said second passageway and simultaneously connecting said feed hole with said third passageway.

6. The apparatus of claim 5 wherein said valve member is a needle valve reciprocally mounted in said casing and having a longitudinal bore and a radially extending hole from said bore to the outer surface of said valve member, said valve member being adapted to reciprocate from a position wherein said longitudinal bore communicates with said feed hole and said radially extending hole communicates with said third passageway to a position wherein said radial hole is out of alignment with said third passageway and said longitudinal bore is out of communication with said feed hole.

7. In an apparatus for extruding a thermoplastic parison having an intermittent stripe extending through the parison wall, comprising a casing member having an axially extending bore therein, mandrel means positioned within said bore and spaced therefrom to form a first passageway, an opening in said casing, an extruder communicating with said opening for supplying a thermoplastic material from which the main portion of the parison is formed, under pressure to said passageway, a ring positioned adjacent the opening of said bore and spaced from the end of said mandrel a predetermined amount to form an extrusion orifice, a plurality of longitudinally extending holes in said casing, cartridge resistant heaters mounted in at least some of said holes, an outer distributor ring positioned in said bore and having an inwardly tapering portion, an inner distributor ring on said mandrel means having an outwardly tapering portion spaced from said first tapering portion a predetermined amount to form a distributor slot, a second passageway in said casing extending parallel to said longitudinal holes, a channel in the internal surface of said casing extending from a point immediately adjacent said opening to a position radially inwardly of said second passageway, a tubular sleeve-like member positioned within said casing and covering said channel, an opening through said casing establishing communication between said opening of said casing and said first passageway, a hole establishing communication between said channel and said second passageway, a chamber in said casing positioned radially outwardly of said distributor slot, an opening in said casing establishing communication between said chamber and the outer surface of said casing, an extruder communicating with said opening to supply a second thermoplastic material from which the stripe is formed, under pressure, a feed hole extending from said chamber to said distributor slot, and a valve member movably mounted in the casing for sealing the feed hole from said chamber and simultaneously establishing communication between said second passageway and said feed hole.

8. The apparatus of claim 7 wherein said valve member is a needle valve member extending radially in alignment with said feed hole and mounted reciprocally in said casing, said needle valve having a longitudinal bore and a radially extending opening in communication with said bore, said needle valve being adapted to reciprocate from a position wherein said longitudinal bore communicates with feed hole and said radially extending opening communicates with said second passageway to a position wherein said radially extending opening is out of communication with said passageway and said longitudinal bore is out of communication with said feed hole.

9. A method of producing an intermittent stripe on a tubular length of thermoplastic, which extends through the wall of the tubular length, comprising passing a first molten thermoplastic material from which the main portion of the tubular length is formed through a zone, injecting a second molten thermoplastic material from which the stripe is formed into a portion of said zone through a feed opening, interrupting the injection of said second material, and simultaneously therewith, injecting said first material into said zone in place of, and through the same opening as that formerly taken by the second material, to maintain a continuous flow of thermoplastic in the stripe forming area of said zone.

10. A method of producing an intermittent stripe in a tubular length of thermoplastic which extends through the wall of the tubular length, comprising passing a first thermoplastic material from which the main portion of the tubular length is formed, through a restricted area, injecting a second thermoplastic material into a portion of said restricted area through a feed opening, and at an angle to the flow of said first material to form the stripe, interrupting the injection of said second material and simultaneously injecting said first material into said restricted area in place of and through the same opening and same angle as said second material was formerly injected, to maintain a continuous flow of thermoplastic in the stripe forming portion of said restricted area.

References Cited
UNITED STATES PATENTS

| | | | |
|---|---|---|---|
| 284,794 | 4/1883 | Allen | 264—209 X |
| 2,138,378 | 11/1938 | Johnson | 264—171 |
| 2,220,221 | 11/1940 | Dalton | 18—14 |
| 2,501,690 | 3/1950 | Prendergast | 264—209 X |
| 2,620,922 | 12/1952 | Deutsch | 18—12 |
| 2,692,404 | 10/1954 | Plourde | 264—171 |
| 2,736,921 | 3/1956 | Mulbarger et al. | 264—209 X |
| 2,750,625 | 6/1956 | Colombo. | |
| 3,097,058 | 6/1963 | Branscum et al. | 264—98 |
| 3,175,247 | 3/1965 | Morrison et al. | 18—12 |
| 3,221,371 | 12/1965 | Stevens | 18—14 |
| 3,223,761 | 12/1965 | Raley | 264—95 |

ALEXANDER H. BRODMERKEL, *Primary Examiner.*

J. H. WOO, *Assistant Examiner.*